(12) United States Patent
Degura (10) Patent No.: US 12,452,509 B2
(45) Date of Patent: Oct. 21, 2025

(54) CONTROL APPARATUS, IMAGE CAPTURING APPARATUS, CONTROL METHOD, AND STORAGE MEDIUM

(71) Applicant: CANON KABUSHIKI KAISHA, Tokyo (JP)

(72) Inventor: Yasusaburo Degura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 121 days.

(21) Appl. No.: 18/544,775

(22) Filed: Dec. 19, 2023

(65) Prior Publication Data

US 2024/0214657 A1    Jun. 27, 2024

(30) Foreign Application Priority Data

Dec. 22, 2022  (JP) ................................. 2022-205986

(51) Int. Cl.
*H04N 23/52*     (2023.01)
*G06F 1/20*      (2006.01)
*G06F 21/44*     (2013.01)

(52) U.S. Cl.
CPC ............... *H04N 23/52* (2023.01); *G06F 1/20* (2013.01); *G06F 21/44* (2013.01)

(58) Field of Classification Search
CPC ........ H04N 23/52; H04N 23/60; H04N 23/62; H04N 23/65; G06F 1/20; G06F 21/44; G06F 1/203
See application file for complete search history.

(56) References Cited

U.S. PATENT DOCUMENTS

| 5,351,498 A * | 10/1994 | Takahashi ............... G05D 23/20 62/99 |
| 9,086,723 B2 * | 7/2015 | Kitajima ............. G06Q 10/1091 |
| 11,310,401 B2 | 4/2022 | Makara et al. |
| 11,499,560 B1 * | 11/2022 | Tan .......................... G06F 1/20 |
| 2007/0147815 A1 * | 6/2007 | Tanaka ............... H04N 1/00347 396/541 |
| 2017/0150051 A1 * | 5/2017 | Ito .......................... G03B 17/48 |

(Continued)

FOREIGN PATENT DOCUMENTS

| JP | 2006-067131 A | 3/2006 |
| JP | 4496868 B2 | 7/2010 |

(Continued)

OTHER PUBLICATIONS

European Search Report issued on May 13, 2024, that issued in the corresponding European Patent Application No. 23213685.3.

*Primary Examiner* — Twyler L Haskins
*Assistant Examiner* — John H Morehead, III
(74) *Attorney, Agent, or Firm* — Cowan, Liebowitz & Latman, P.C.

(57) ABSTRACT

A control apparatus comprises: a detecting unit configured to detect connection of a cooling apparatus; an authenticating unit configured to authenticate the cooling apparatus whose connection has been detected by the detecting unit; and a controlling unit configured to control operation of the cooling apparatus. In a case where the cooling apparatus is not authenticated by the authenticating unit, the controlling unit accepts input of a policy regarding control of the operation of the cooling apparatus and controls the operation of the cooling apparatus based on the input policy.

16 Claims, 5 Drawing Sheets

(56) References Cited

U.S. PATENT DOCUMENTS

| | | | | |
|---|---|---|---|---|
| 2019/0154949 | A1* | 5/2019 | Hosoe | G05D 23/1919 |
| 2019/0317564 | A1* | 10/2019 | Hamann | G06F 1/1628 |
| 2020/0007740 | A1* | 1/2020 | Sugita | H04N 23/663 |
| 2020/0007744 | A1* | 1/2020 | Sugiyama | H04N 23/6812 |
| 2021/0036459 | A1 | 2/2021 | Daoust et al. | |
| 2021/0141430 | A1* | 5/2021 | Huang | H05K 7/20836 |
| 2022/0229671 | A1* | 7/2022 | Nadathur | H04M 1/72409 |
| 2022/0232730 | A1* | 7/2022 | Trim | G06F 1/1684 |
| 2023/0199290 | A1* | 6/2023 | Degura | H05K 7/20209 |
| | | | | 348/374 |

FOREIGN PATENT DOCUMENTS

| | | |
|---|---|---|
| JP | 2017-120950 A | 7/2017 |
| JP | 2019-114893 A | 7/2019 |
| WO | 2022201883 A1 | 9/2022 |

* cited by examiner

CONTROL APPARATUS, IMAGE CAPTURING APPARATUS, CONTROL METHOD, AND STORAGE MEDIUM

BACKGROUND OF THE INVENTION

Field of the Invention

The present invention relates to a control apparatus, an image capturing apparatus, a control method, and a program, and particularly relates to a technique for controlling the operation of a connected cooling apparatus.

Description of the Related Art

There is a device that switches to a different operation if it is difficult, due to an external cause, to execute the function that is normally executed (Japanese Patent Laid-Open No. 2006-067131).

Incidentally, due to the recent demand for an increase in the number of pixels, an image sensor such as that of the CCD or MOS type that is provided in an image capturing apparatus needs to be controlled so that an output image signal has suitable quality. For example, fixed pattern noise caused by a dark current may occur in the image signal if an increase in temperature occurs due to ambient temperature and/or self-heating during use. The fixed pattern noise reduces the signal-to-noise ratio between the image signal and noise, and thus is a cause of a decrease in image-signal image quality. Accordingly, in order to ensure that the output image signal is in a suitable form, heat dissipation needs to be appropriately controlled in the image capturing apparatus.

Meanwhile, recent years have seen the emergence of a cooling apparatus configured to be externally connectable to an image capturing apparatus or the like so that an image sensor, the ambient atmosphere around the image sensor, and/or the like can be maintained at an appropriate temperature. For example, the cooling apparatus includes a Peltier element or the like, and suppresses the occurrence of a dark current in the image sensor by cooling the image capturing apparatus to which the cooling apparatus is attached.

Incidentally, because cooling apparatuses can be provided from various sellers, control of coordination between a connected cooling apparatus and an image capturing apparatus may not be performed in a suitable manner. Specifically, in a case in which image sensor operation is switched upon connection of a cooling apparatus, image degradation that is not intended by a user may occur due to appropriate heat-dissipation control not being performed. For example, upon connection of a cooling apparatus whose cooling performance is known, image sensor operation can be controlled based on information about the cooling performance so that an image signal having suitable image quality is output. On the other hand, in the case of a cooling apparatus whose cooling performance is unknown, there are cases in which, even if the cooling apparatus is connected, output of an image signal having suitable image quality is not guaranteed.

However, in a case in which a cooling apparatus whose cooling performance is unknown is connected, user intention would be ignored if control were switched as in Japanese Patent Laid-Open No. 2006-067131 such that the operation of the cooling apparatus is unconditionally disabled. Specifically, the user may lose the opportunity to record an image signal having suitable image quality because the cooling apparatus cannot be used during image capturing, even if the user knows that the cooling apparatus has sufficient cooling performance.

SUMMARY OF THE INVENTION

The present invention has been made in view of the above-described problem, and provides a control apparatus, an image capturing apparatus, a control method, and a program for causing a cooling apparatus to operate in a manner such that user intention is reflected.

The present invention in its first aspect provides a control apparatus comprising: a detecting unit configured to detect connection of a cooling apparatus; an authenticating unit configured to authenticate the cooling apparatus whose connection has been detected by the detecting unit; and a controlling unit configured to control operation of the cooling apparatus, wherein, in a case where the cooling apparatus is not authenticated by the authenticating unit, the controlling unit accepts input of a policy regarding control of the operation of the cooling apparatus and controls the operation of the cooling apparatus based on the input policy.

The present invention in its second aspect provides an image capturing apparatus configured so that a cooling apparatus is connectable thereto, the image capturing apparatus comprising: an image capturing unit; an operation inputting unit configured to accept input operations; and the control apparatus of the first aspect.

The present invention in its third aspect provides a control method for a control apparatus, the control method comprising: detecting connection of a cooling apparatus; authenticating the cooling apparatus whose connection has been detected in the detecting; and controlling operation of the cooling apparatus, wherein, in a case where the cooling apparatus is not authenticated, input of a policy regarding control of the operation of the cooling apparatus is accepted and the operation of the cooling apparatus is controlled based on the input policy.

The present invention in its fourth aspect provides a computer-readable storage medium storing a program for causing a computer to function as the units of the control apparatus of the first aspect.

Further features of the present invention will become apparent from the following description of exemplary embodiments (with reference to the attached drawings).

DESCRIPTION OF THE EMBODIMENTS

Embodiment 1

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

In the embodiment described below, description will be provided of an example in which the present invention is applied to a digital camera that can control the operation of a connected cooling apparatus and is one example of a control apparatus. However, the present invention is applicable to any device that can control the operation of a connected cooling apparatus.

System Configuration

Figure 1:
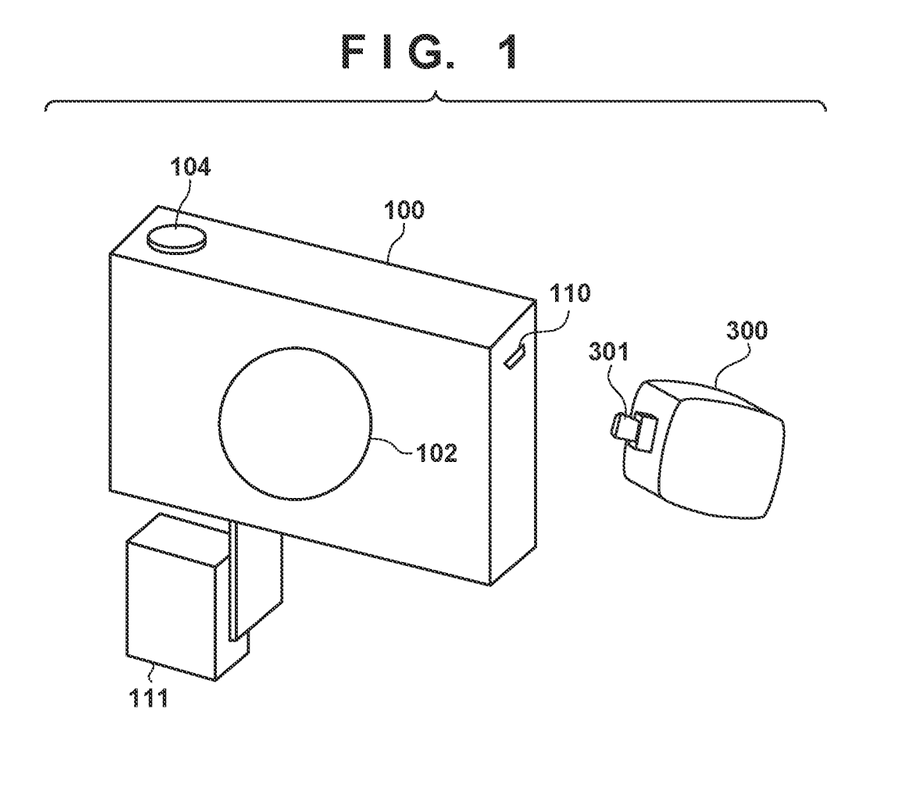
FIG. 1 is a diagram illustrating an example of a system configuration according to embodiments and modifications of the present invention.

FIG. 1 is a diagram illustrating an example of a system configuration according to the present embodiment. The system is constituted by a digital camera 100 and a cooling apparatus 300 that is configured to be connectable to the digital camera 100.

As illustrated in the drawing, the digital camera 100 according to the present embodiment is an image capturing apparatus including an image capturing unit 102, an operation input unit 104, and an image-capturing-side connection unit 110 that are described later. The digital camera 100 is configured so that a battery 111 can be inserted thereto and removed therefrom, and operates on power supplied from the battery 111 when the battery 111 is inserted.

Furthermore, the cooling apparatus 300 is an apparatus that has the function of cooling an apparatus connected thereto via a cooling-side connection unit 301. In the present embodiment, the digital camera 100 and the cooling apparatus 300 are configured to be capable of operating in conjunction when the image-capturing-side connection unit 110 and the cooling-side connection unit 301 are connected via a cable or the like. In a state in which the image-capturing-side connection unit 110 and the cooling-side connection unit 301 are connected, the transmission/reception of signals and power supply can be performed between the digital camera 100 and the cooling apparatus 300.

When connected to the digital camera 100, the cooling apparatus 300 can directly or indirectly cool a circuit board of the digital camera 100 on which a heat source is mounted. For example, during use, the cooling apparatus 300 can cool the digital camera 100 by being placed in contact with or near a predetermined part of the digital camera 100.

Digital Camera Configuration

Figure 2:
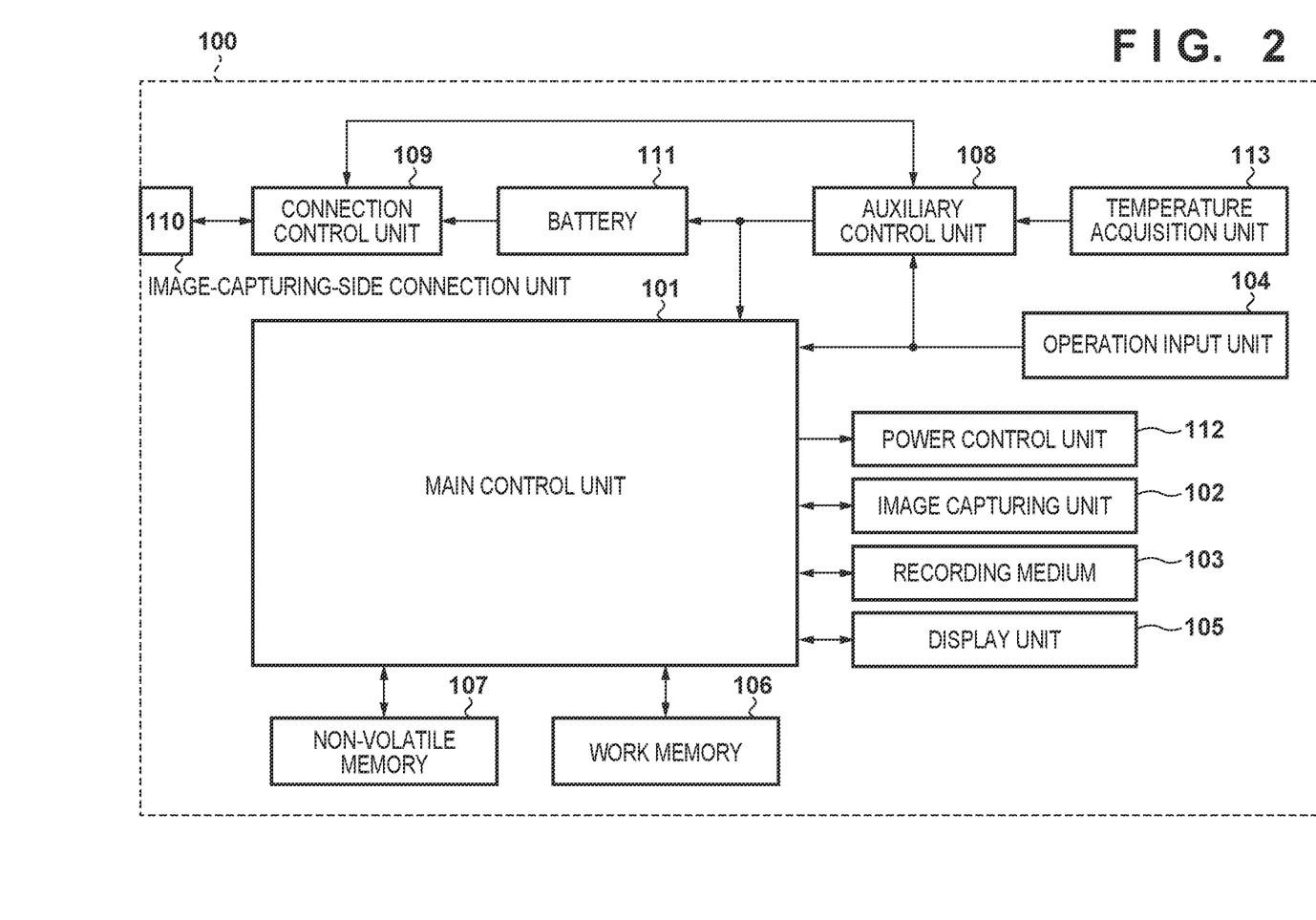
FIG. 2 is a block diagram illustrating an example of a functional configuration of a digital camera 100 according to the embodiments and modifications of the present invention.

Next, a functional configuration of the digital camera 100 according to the present embodiment will be described with reference to the block diagram in FIG. 2.

A main control unit 101 is a control apparatus that controls the operation of blocks included in the digital camera 100. The main control unit 101 controls the operation of the blocks by reading operation programs for the respective blocks from a non-volatile memory 107, and decompressing and executing the operation programs in a work memory 106. Upon controlling the operation of the blocks, the main control unit 101 can also use signals input via various interfaces. Note that, in the present embodiment, description will be provided assuming that the single main control unit 101 controls the operation of the entire digital camera 100. However, the present invention is not limited to being implemented in such a form, and the operation of the blocks may be shared and controlled by a plurality of control apparatuses.

An image capturing unit 102 includes an image sensor such as a CCD or CMOS sensor. The image capturing unit 102 outputs, as image data, a digital image signal obtained by photoelectrically converting an optical image that is formed on a light-receiving surface of the image sensor via an image capturing optical system, and applying various types of image processing, such as A/D conversion processing and noise reduction processing. Image data output as a result of image capturing is stored in an unillustrated buffer memory, and is then recorded to a recording medium 103 after predetermined computational processing is applied by the main control unit 101.

The recording medium 103 is a storage apparatus in which image data obtained as a result of image capturing is stored. For example, the recording medium 103 may be a recording medium, such as a memory card, configured to be attachable to and detachable from the digital camera 100, or may be a recording medium, such as a built-in memory, that is built into the digital camera 100.

The operation input unit 104 is a user interface for accepting various input operations performed on the digital camera 100. Upon detecting input operations performed on various operation members, the operation input unit 104 outputs corresponding control signals to the main control unit 101 or a later-described auxiliary control unit 108. For example, the operation members may include a power button for accepting switching of the on and off of the power of the digital camera 100, a release switch for accepting a shooting instruction, and a zoom bar for accepting a zoom operation instruction. In addition, the operation input unit 104 may include a playback button for accepting an instruction to play back image data, and a mode dial for accepting an instruction to change the activation mode of the digital camera 100. Furthermore, in a form of implementation in which a display unit 105 is configured to be capable of detecting touch operations, a touch panel sensor for detecting touch operations is also included in the operation input unit 104.

For example, the release switch is configured to be capable of accepting input operations in two levels, and the operation input unit 104 outputs an SW1 signal or an SW2 signal to the main control unit 101 or the like depending on the input operation performed on the release switch. Specifically, the operation input unit 104 outputs a control signal for switching SW1 on when the release switch is pressed to a half-press state. Based on this SW1 signal, the main control unit 101 executes various types of control processing relating to shooting preparation, such as auto-focus (AF) processing, auto-exposure (AE) processing, auto-white balance (AWB) processing, and preliminary flash emission (EF) processing. Furthermore, the operation input unit 104 outputs a control signal for switching SW2 on when the release switch is pressed to a full-press state. Based on the SW2 signal, the main control unit 101 executes various types of processing for shooting.

The display unit 105 is a display apparatus such as an LCD. In a shooting mode, the display unit 105 also functions as a view finder by sequentially displaying (through-display) image data obtained by intermittent image capturing. Furthermore, the display unit 105 is used to display image data obtained by image shooting, and is also used for purposes such as GUI display for interactive operation. Note that, while description is provided in the present embodiment supposing that the display unit 105 is a display apparatus built into the digital camera 100, the present invention is not limited to being implemented in such a form. For example, the display unit 105 may be an external display apparatus that is configured to be connectable to the digital camera 100.

For example, the work memory 106 is a storage apparatus, such as a random access memory (RAM), that can temporarily store information. The work memory 106 is used not only as an area to which the operation programs of the blocks of the digital camera 100 are decompressed, but also as a storage area for storing intermediate data output during the operation of the blocks, and the like. Furthermore, the work memory 106 also functions as a buffer memory for temporarily holding image data output as a result of image capturing, an image display memory for the display unit 105, a work area for the main control unit 101, and the like.

The non-volatile memory 107 is a storage apparatus, such as a read-only memory (ROM), that can permanently store information. Information can be electrically erased from and recorded to the non-volatile memory 107. In addition to the operation programs of the blocks of the digital camera 100, the non-volatile memory 107 stores information regarding parameters that are necessary for the operation of the blocks, information regarding various GUIs, and the like.

The auxiliary control unit 108 is a control apparatus that is provided separately from the main control unit 101 and that controls some operations of the digital camera 100. The auxiliary control unit 108 includes a CPU that controls the relevant operations, a random access memory (RAM) that is used as a work area, and a read-only memory (ROM) that stores processing procedures. The auxiliary control unit 108 can operate with less power consumption than the main control unit 101, and is configured to be capable of controlling the later-described connection control unit 109. The auxiliary control unit 108 is configured to be capable of transmitting and receiving information to and from the main control unit 101.

The image-capturing-side connection unit 110 is an interface for connection with the cooling apparatus 300. The digital camera 100 and the cooling apparatus 300 can transmit and receive information to and from one another by the image-capturing-side connection unit 110 and the cooling-side connection unit 301 being connected, as described above. Furthermore, in the present embodiment, when the digital camera 100 and the cooling apparatus 300 are connected, power supply from the digital camera 100 to the cooling apparatus 300 is also performed via the image-capturing-side connection unit 110. Such control performed via the image-capturing-side connection unit 110 is controlled by the connection control unit 109. Specifically, the connection control unit 109 identifies the cooling apparatus 300 by exchanging information with the cooling apparatus 300, and performs various types of control of the cooling apparatus 300.

The battery 111 is a power supply source that is configured to be attachable to and detachable from the digital camera 100. The battery 111 supplies power that is necessary for causing the blocks of the digital camera 100 to operate. Furthermore, in the present embodiment, the battery 111 also performs power supply to the cooling apparatus 300 via the image-capturing-side connection unit 110 based on control by the connection control unit 109. Specifically, the power supply to the cooling apparatus 300 by the connection control unit 109 is performed from the battery 111, which is a power source that the connection control unit 109 shares with the other blocks of the digital camera 100.

A power control unit 112 performs control of supplying and cutting off power from the battery 111 to components depending on the state of the digital camera 100. The operation of the power control unit 112 is controlled by the main control unit 101 or the auxiliary control unit 108.

A temperature acquisition unit 113 acquires information regarding the temperature of a predetermined part of the digital camera 100 (temperature information). While description is provided in the present embodiment assuming that the auxiliary control unit 108 performs control by receiving the temperature information acquired by the temperature acquisition unit 113, the present invention is not limited to being implemented in such a form. It may be the main control unit 101 or the connection control unit 109 that receives the temperature information acquired by the temperature acquisition unit 113.

Cooling Apparatus Configuration

Figure 3:
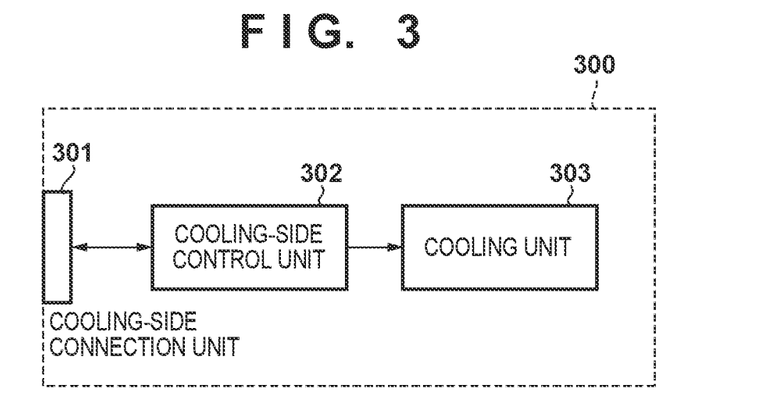
FIG. 3 is a block diagram illustrating an example of a functional configuration of a cooling apparatus 300 according to the embodiments and modifications of the present invention.

Next, a functional configuration of the cooling apparatus 300 according to the present embodiment will be described with reference to the block diagram in FIG. 3.

The cooling-side connection unit 301 is an interface for connection with the digital camera 100. Similarly to the image-capturing-side connection unit 110, the cooling apparatus 300 transmits and receives information to and from the digital camera 100 and receives power supply from the digital camera 100 via the cooling-side connection unit 301.

A cooling-side control unit 302 is a control apparatus that controls the operation of blocks included in the cooling apparatus 300. The cooling-side control unit 302 basically controls the operation of the blocks by acquiring information necessary for control from the connection control unit 109 of the digital camera 100.

The cooling-side control unit 302 performs various types of control of the cooling apparatus 300 by acquiring necessary information from the connection control unit 109 of the connected digital camera 100.

A cooling unit 303 realizes the cooling function of a Peltier element, an air blower unit, or the like, for example. In the present embodiment, the cooling unit 303 is configured to be capable of changing the cooling performance thereof depending on the power supplied.

Overview of Operations of Connection Control Unit

Figure 4:
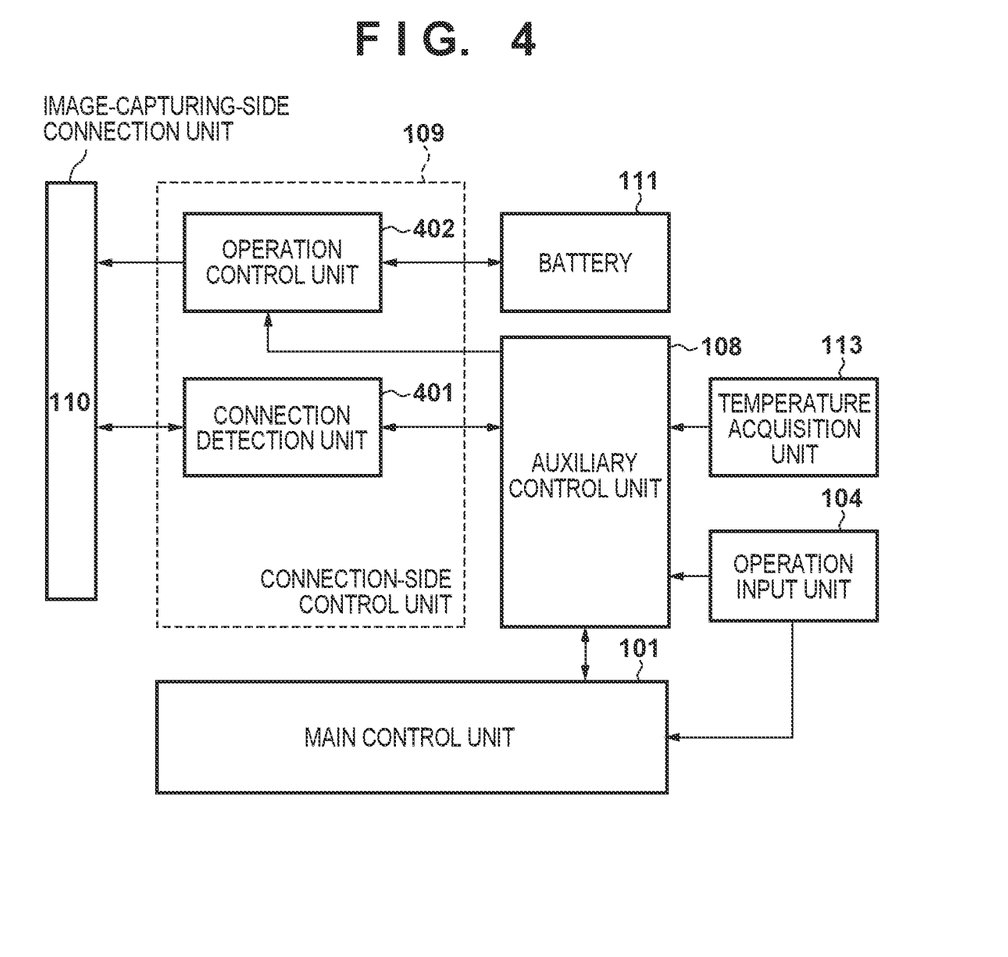
FIG. 4 is a block diagram illustrating an example of a detailed configuration of a connection control unit 109 according to the embodiments and modifications of the present invention.

Next, an overview of operations performed by the connection control unit 109 in relation to the connection of the digital camera 100 and the cooling apparatus 300 having such configurations will be described with reference to FIG. 4. FIG. 4 is a block diagram illustrating a detailed configuration of the connection control unit 109. As illustrated in the drawing, the connection control unit 109 according to the present embodiment includes a connection detection unit 401 and an operation control unit 402.

The connection detection unit 401 detects the connection of the cooling apparatus 300 to the image-capturing-side connection unit 110. For example, the connection detection unit 401 may be configured to be capable of periodically acquiring the voltage value of a connection detection terminal of the image-capturing-side connection unit 110 as a result of a first resistor connected to a predetermined voltage being connected to the connection detection terminal. In this case, the cooling apparatus 300 can be detected by the connection detection unit 401 as a result of a configuration being adopted such that a terminal of the cooling-side connection unit 301 that is electrically coupled to the connection detection terminal upon connection of the cooling apparatus 300 is connected to GND. Specifically, because the voltage value of the connection detection terminal changes from the predetermined voltage to 0 V when the cooling apparatus 300 is connected to the image-capturing-side connection unit 110, the connection detection unit 401 can detect the connection of the cooling apparatus 300 based on this voltage change.

The operation control unit 402 controls the reception of information from the cooling apparatus 300 connected to the image-capturing-side connection unit 110, and controls the transmission of information and supply of power to the cooling apparatus 300.

When the connection of the cooling apparatus 300 is detected by the connection detection unit 401, the operation control unit 402 executes authentication communication to identify the cooling apparatus 300. In the authentication communication, the operation control unit 402 receives authentication information including the individual name of the cooling apparatus 300. Here, the authentication communication is configured to be successful for a cooling apparatus 300 registered in advance as being usable with the digital camera 100, or is configured to be successful for a cooling apparatus 300 conforming to a predetermined standard. In other words, the authentication communication is performed to determine whether or not a cooling apparatus 300 is connected with which the operation of the digital camera 100 would be guaranteed even if power supply control is performed. If the authentication communication is successful, the operation control unit 402 can acquire, as authentication information, the individual name of the connected cooling apparatus 300 and information regarding the amount of power necessary for controlling various operations of the cooling apparatus 300.

Furthermore, when the connection of the cooling apparatus 300 has been detected, the operation control unit 402 supplies power necessary for the cooling apparatus 300 to operate. Here, if the authentication communication is successful, the operation control unit 402 can supply power that is appropriate for the operation of the cooling apparatus 300 by referring to the received authentication information. That is, the operation control unit 402 controls power supply to the cooling apparatus 300 based on a policy regarding power supply set in advance with respect to the individual name of the cooling apparatus 300. As described above, the cooling performance of the cooling unit 303 in the cooling apparatus 300 according to the present embodiment changes depending on the power supplied. Accordingly, the operation control unit 402 can indirectly control the operation of the cooling unit 303 by controlling the amount of power supplied to the cooling apparatus 300. That is, the operation control unit 402 can perform control of starting and stopping the operation of the cooling apparatus 300.

Furthermore, the operation control unit 402 can detect a drive state of the cooling apparatus 300 connected to the image-capturing-side connection unit 110 based on the voltage value and the current value of the power supplied. In addition, the drive state of the cooling apparatus 300 can also be detected in a case in which operation noise of the cooling apparatus 300 is collected using an unillustrated microphone included in the digital camera 100. Alternatively, the drive state of the cooling apparatus 300 can be detected when cooling of a part of the digital camera 100 is detected based on output from unillustrated temperature sensors that are provided to a plurality of parts of the digital camera 100. Furthermore, the drive state of the cooling apparatus 300 may be detected according to other methods, such as using a proximity sensor and detecting the attachment of an object to a part to which the cooling apparatus 300 is to be attached, or receiving user input indicating the drive state of the cooling apparatus 300.

Operation Control Processing

Figure 5:
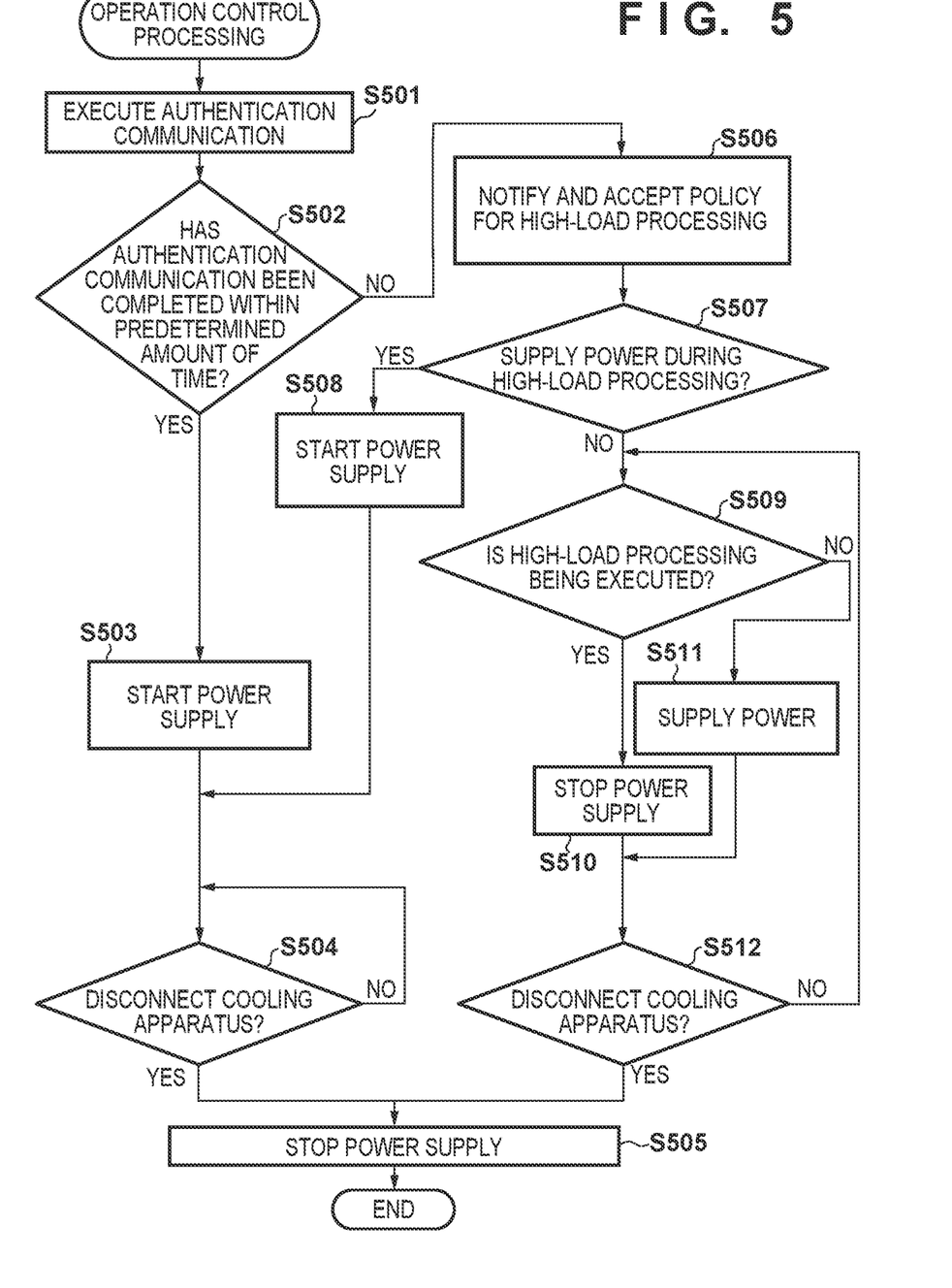
FIG. 5 is a flowchart illustrating an example of operation control processing executed in the digital camera 100 according to embodiment 1 of the present invention.

In regard to the operation control processing of a cooling apparatus 300 executed by the connection control unit 109 in the digital camera 100 according to the present embodiment having such a configuration, specific processing will be described with reference to the flowchart in FIG. 5. For example, the main control unit 101 can mainly cause the connection control unit 109 to carry out operations corresponding to the processing corresponding to the flowchart by reading a corresponding processing program stored in the non-volatile memory 107, and decompressing and executing the processing program in the work memory 106. Description will be provided assuming that this operation control processing is started when the connection detection unit 401 has detected the connection of a cooling apparatus 300 to the image-capturing-side connection unit 110, for example.

In step S501, the operation control unit 402 executes authentication communication with the connected cooling apparatus 300 (hereinafter "target cooling apparatus").

In step S502, the operation control unit 402 determines whether or not the authentication communication has been completed within a predetermined amount of time. As described above, the authentication communication is successful if it is registered that the target cooling apparatus is usable with the digital camera 100, or if the target cooling apparatus conforms to a predetermined standard. Accordingly, if the target cooling apparatus does not meet such conditions, the authentication communication is not completed within the predetermined amount of time because the authentication communication is unsuccessful. That is, in this step, the operation control unit 402 determines whether or not the target cooling apparatus is an authenticated cooling apparatus 300 that would not inhibit the digital camera 100 from operating suitably. The connection control unit 109 transitions processing to step S503 upon determining that the authentication communication has been completed within the predetermined amount of time, and transitions processing to step S506 upon determining otherwise.

In step S503, the operation control unit 402 starts to supply necessary power to the target cooling apparatus based on authentication information. Specifically, the operation control unit 402 performs control for supplying power necessary for the operation of the target cooling apparatus; the necessary power is defined by a policy regarding power supply set in advance with respect to the individual name of the target cooling apparatus or, that is, a policy regarding power supply included in the authentication information. Here, control may be performed such that information regarding the individual name of the target cooling apparatus is displayed on the display unit 105 in order to provide a notification that an authenticated cooling apparatus 300 is connected.

In step S504, the connection detection unit 401 determines whether or not the connection of the target cooling apparatus has been released (disconnected). The connection detection unit 401 transitions processing to step S505 upon determining that the target cooling apparatus has been disconnected, and repeats the processing in this step upon determining otherwise.

In step S505, in response to the disconnection of the target cooling apparatus, the operation control unit 402 stops the power supply to the target cooling apparatus and concludes this operation control processing.

On the other hand, upon determining in step S502 that the authentication communication has not been completed within the predetermined amount of time, the main control unit 101, in step S506, notifies the user that the operation of the target cooling apparatus cannot be guaranteed. Furthermore, the main control unit 101 accepts user input of a selection as to whether or not power supply to the target cooling apparatus during execution of high-load processing in the digital camera 100 is to be performed. The main control unit 101 transitions processing to step S507 when input of the selection is accepted.

For example, during high-frame-rate drive of the image capturing unit 102, the maximum power that can be supplied to the target cooling apparatus from the battery 111 decreases because power consumption in the digital camera 100 increases. Furthermore, for example, an increase in power consumption of the digital camera 100 may similarly occur also in a case in which the image capturing unit 102 reads a signal having a large number of pixels, such as a 4K signal. Due to this, under situations in which the maximum power that can be supplied decreases, it is not clear whether the target cooling apparatus can operate suitably using the power supplied from the operation control unit 402. In other words, normal operation of the target cooling apparatus cannot be guaranteed during the execution, in the digital camera 100, of high-load processing in which power consumption exceeds a threshold, such as high-frame-rate drive of the image capturing unit 102, for example.

On the other hand, control in which use of the target cooling apparatus is disabled due to the target cooling apparatus not being an authenticated apparatus could be undesirable for the user. Thus, in the digital camera 100 according to the present embodiment, if the connected cooling apparatus 300 is not an authenticated apparatus, the user is notified that the apparatus may not operate properly, and is then asked to input a control policy regarding power supply to the apparatus. In the present embodiment, the user can select either to continue or stop power supply as the control policy to be applied to an unauthenticated cooling apparatus 300 during the execution of predetermined high-load processing.

Note that the notification and the acceptance of an input operation in this step may be accompanied by the display of information on the display unit 105. In addition, an indication to the effect that a cooling apparatus 300 with which authentication communication cannot be executed is connected may be displayed on the display unit 105.

In step S507, the main control unit 101 determines whether or not input has been performed indicating a selection to perform power supply to the target cooling apparatus during the execution of the predetermined high-load processing. The main control unit 101 transitions processing to step S508 upon determining that input has been performed indicating a selection to perform power supply to the target cooling apparatus during the execution of the predetermined high-load processing, and transitions processing to step S509 upon determining that input has been performed indicating a selection not to perform the power supply.

In step S508, the operation control unit 402 starts to supply necessary power to the target cooling apparatus based on the policy input in step S506. Here, control may be performed such that information indicating that an unauthenticated cooling apparatus 300 is connected is displayed on the display unit 105 in order to provide a notification to that effect.

On the other hand, upon determining in step S507 that input has been performed indicating a selection not to perform power supply during execution of the predetermined high-load processing, the main control unit 101, in step S509, determines whether or not the predetermined high-load processing is being executed in the digital camera 100. For example, the main control unit 101 performs the determination in this step based on whether or not the image capturing unit 102 is driving at a high frame rate. The main control unit 101 transitions processing to step S510 upon determining that the predetermined high-load processing is being executed, and transitions processing to step S511 upon determining otherwise.

In step S510, the operation control unit 402 stops power supply to the target cooling apparatus based on the policy input in step S506.

Furthermore, if it is determined in step S509 that the predetermined high-load processing is not being executed, the operation control unit 402, in step S511, supplies necessary power to the target cooling apparatus based on the policy input in step S506.

In step S512, the connection detection unit 401 determines whether or not the connection of the target cooling apparatus has been released (disconnected). The connection detection unit 401 transitions processing to step S505 upon determining that the target cooling apparatus has been disconnected, and returns the processing to step S509 upon determining that the target cooling apparatus is not disconnected.

As described above, according to the control apparatus in the present embodiment, a cooling apparatus can be caused to operate in a manner such that user intention is reflected. Specifically, in a case in which an unauthenticated cooling apparatus 300 is connected, a cooling effect and operation matching user intention can be realized because a policy as to how power supply should be controlled under situations in which normal operation cannot be guaranteed is managed based on an input operation by the user.

Note that, while description has been provided supposing that power supply to the target cooling apparatus is started after the authentication communication is executed in the operation control processing according to the present embodiment, a configuration may be adopted in which power necessary for the execution of the authentication communication is supplied to the target cooling apparatus. That is, the operation control unit 402 may supply power for executing the authentication communication to the target cooling apparatus prior to the supply of power necessary for causing the cooling unit 303 to operate. In this case, the operation control unit 402 may stop the supply of power if the authentication communication is not completed within the predetermined amount of time.

Embodiment 2

In the above-described embodiment, description has been provided of a form of implementation in which power is supplied from the digital camera 100 to a cooling apparatus 300; however, the present invention is not limited to being implemented in such a form. A cooling apparatus 300 that can be connected to the digital camera 100 may include a battery for the operation of the cooling apparatus 300 itself, and may be capable of operating without receiving power supply from the digital camera 100. In the present embodiment, a form of implementation will be described in which a cooling apparatus 300 has an unillustrated built-in battery, and power is supplied from the battery when the cooling unit 303 operates.

Operation Control Processing

Figure 6:
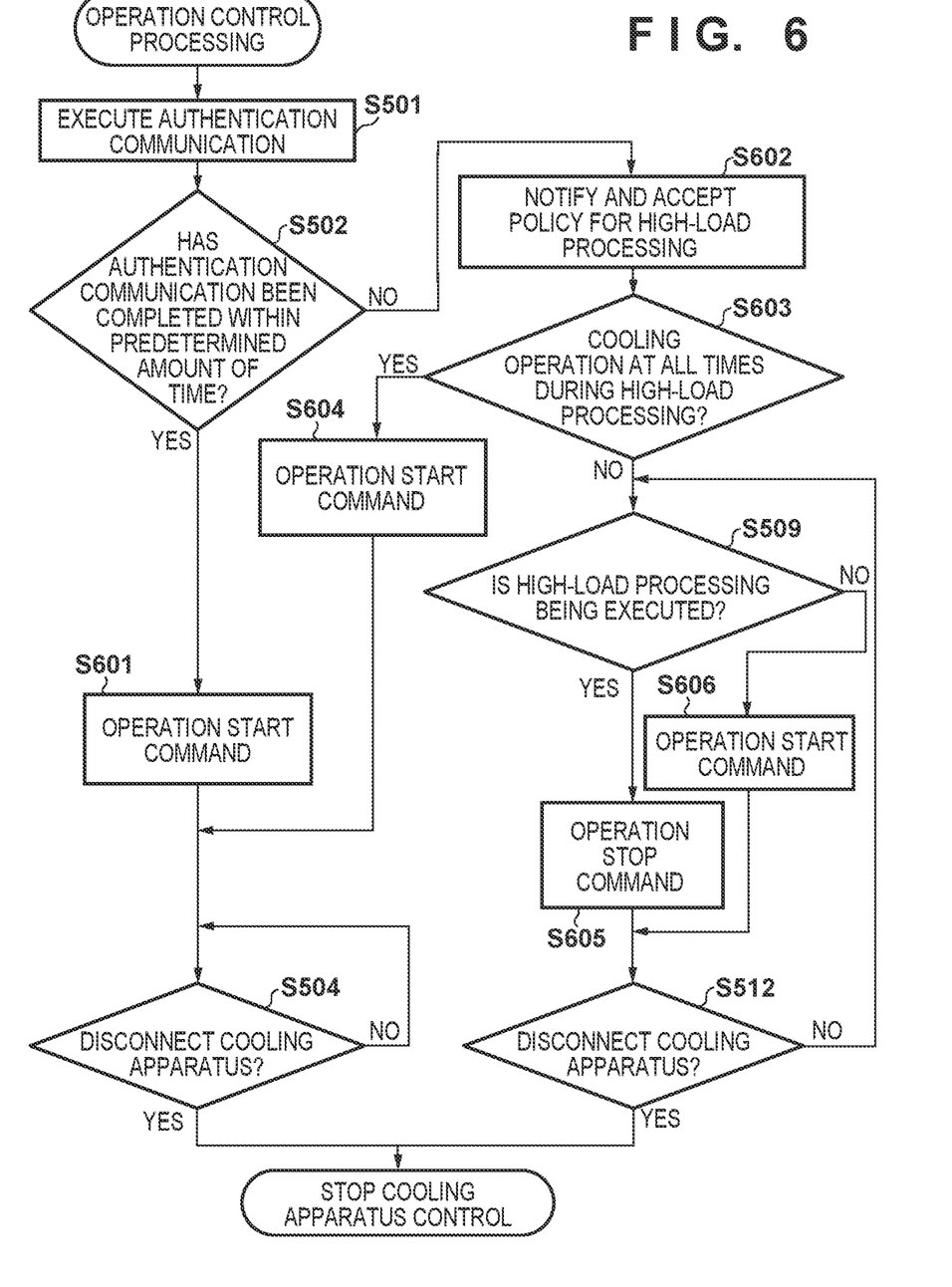
FIG. 6 is a flowchart illustrating an example of operation control processing executed in the digital camera 100 according to embodiment 2 of the present invention.

In regard to the operation control processing of a cooling apparatus 300 executed by the connection control unit 109 in the digital camera 100 according to the present embodiment, specific processing will be described with reference to the flowchart in FIG. 6. For example, the main control unit 101 can mainly cause the connection control unit 109 to carry out operations corresponding to the processing corresponding to the flowchart by reading a corresponding processing program stored in the non-volatile memory 107, and decompressing and executing the processing program in the work memory 106. Description will be provided assuming that this operation control processing is started when the connection detection unit 401 has detected the connection of a cooling apparatus 300 to the image-capturing-side connection unit 110, for example. Note that, in the description of the operation control processing according to the present embodiment, steps in which processing similar to that in the operation control processing according to embodiment 1 is performed are given the same reference numerals and description thereof will be omitted, and processing specific to the present embodiment will be described below.

Upon determining in step S502 that the authentication communication has been completed within the predetermined amount of time, the operation control unit 402, in step S601, transmits a control command relating to starting the operation of the cooling unit 303 to the target cooling apparatus. Specifically, the operation control unit 402 performs control for transmitting a control command for causing the target cooling apparatus to operate; the control command is defined by a policy regarding operation control set in advance with respect to the individual name of the target cooling apparatus, or that is, a policy regarding operation control included in the authentication information. Here, control may be performed such that information regarding the individual name of the target cooling apparatus is displayed on the display unit 105 in order to provide a notification that an authenticated cooling apparatus 300 is connected.

Furthermore, upon determining in step S502 that the authentication communication has not been completed within the predetermined amount of time, the main control unit 101, in step S602, notifies the user that normal operation of the target cooling apparatus cannot be guaranteed. Furthermore, the main control unit 101 accepts user input of a selection as to whether or not to cause the target cooling apparatus to perform a cooling operation at all times, even during execution of high-load processing in the digital camera 100. The main control unit 101 transitions processing to step S603 when input of the selection is accepted.

For example, during high-frame-rate drive of the image capturing unit 102, the frequency at which control commands are transmitted to a cooling apparatus 300 by the operation control unit 402 may decrease because the computation amount per unit time of the main control unit 101 and the auxiliary control unit 108 in the digital camera 100 increases. Furthermore, for example, the computation amount per unit time of the main control unit 101 and the auxiliary control unit 108 may similarly increase also in a case in which the image capturing unit 102 reads a signal having a large number of pixels, such as a 4K signal. Specifically, because the blocks included in the digital camera 100 share the same computational resources, an increase in computation amount caused by processing by some blocks would limit the computational resources available to other blocks. Furthermore, under situations in which computational resources are limited, appropriate control commands may not be transmitted from the operation control unit 402 at an appropriate frequency, making it unclear whether the transmission-target cooling apparatus would operate as desired. In other words, operation of the target cooling apparatus cannot be guaranteed during the execution, in the digital camera 100, of high-load processing in which the computation amount exceeds a threshold, such as high-frame-rate drive of the image capturing unit 102, for example.

Thus, in the digital camera 100 according to the present embodiment, if the connected cooling apparatus 300 is not an authenticated apparatus, the user is notified that the apparatus may not operate properly, and is then asked to input a control policy of the apparatus. In the present embodiment, the user can select either to transmit a control command causing the cooling operation to be performed at all times or to transmit a control command causing the cooling operation to be stopped as the control policy to be applied to unauthenticated cooling apparatuses 300 during the execution of predetermined high-load processing.

Note that the notification and the acceptance of an input operation in this step may be accompanied by the display of information on the display unit 105. In addition, an indication to the effect that a cooling apparatus 300 with which authentication communication cannot be executed is connected may be displayed on the display unit 105.

In step S603, the main control unit 101 determines whether or not input has been performed indicating a selection to cause the target cooling apparatus to perform the cooling operation at all times, even during the execution of the predetermined high-load processing. The main control unit 101 transitions processing to step S604 upon determining that input has been performed indicating a selection to cause the target cooling apparatus to perform the cooling operation at all times, and transitions processing to step S509 upon determining that input has been performed indicating a selection not to cause the target cooling apparatus to perform the cooling operation at all times.

In step S604, the operation control unit 402 transmits a control command relating to starting the operation of the cooling unit 303 to the target cooling apparatus based on the policy input in step S602. Here, control may be performed such that information indicating that an unauthenticated cooling apparatus 300 is connected is displayed on the display unit 105 in order to provide a notification to that effect.

Furthermore, upon determining in step S509 that the predetermined high-load processing is being executed, the operation control unit 402, in step S605, transmits a control command relating to stopping the operation of the cooling unit 303 to the target cooling apparatus based on the policy input in step S602.

On the other hand, if it is determined in step S509 that the predetermined high-load processing is not being executed, the operation control unit 402, in step S606, transmits a control command relating to starting the operation of the cooling unit 303 to the target cooling apparatus based on the policy input in step S602.

As described above, according to the control apparatus in the present embodiment, a cooling apparatus can be caused to operate in a manner such that user intention is reflected. Specifically, in a case in which an unauthenticated cooling apparatus 300 is connected, a cooling effect and operation matching user intention can be realized because the manner in which operation control should be performed under situations in which normal operation cannot be guaranteed is managed based on an input operation by the user.

Note that, while a form of implementation in which a cooling apparatus 300 has a built-in battery has been described in the present embodiment, the present invention is not limited to being implemented in such a form. The present invention is sufficient as long as operation control applied to a cooling apparatus 300 in accordance with the operation state of the digital camera 100 is switched based on user selection, and power may be supplied to the cooling apparatus 300 from an external power source.

Modification 1

In the above-described embodiments, description has been provided that, in a case in which the predetermined high-load processing is executed in the digital camera 100, switching between stopping the operation of an unauthenticated target cooling apparatus and letting the operation of the unauthenticated target cooling apparatus continue is performed based on user selection. However, the present invention is not limited to being implemented in such a form, and may be implemented such that operation control is gradually performed. Specifically, during the execution of the predetermined high-load processing, rather than the operation of the target cooling apparatus being stopped, the power supply amount and/or control frequency may be reduced compared to a state in which the predetermined high-load processing is not being executed. In this case, the degree of reduction may be varied depending on the type and execution state of the predetermined high-load processing.

Modification 2

In the above-described embodiments, description has been provided that, when it is identified that the target cooling apparatus is an unauthenticated cooling apparatus 300, user input is accepted of a policy regarding control of the operation of the target cooling apparatus during execution of the predetermined high-load processing; however, the present invention is not limited to being implemented in such a form. For example, a configuration may be adopted such that the user can record in advance a policy defining details of control of the operation of third-party cooling apparatuses 300 and the like, and the policy is acquired to perform control when it is identified that the target cooling apparatus is an unauthenticated cooling apparatus 300.

Modification 3

In the above-described embodiments, description is provided that input of a policy regarding control of the operation of an unauthenticated target cooling apparatus is accepted if the predetermined high-load processing is being executed in the digital camera 100; however, the present invention is not limited to being implemented in such a form. Specifically, because the influence that an unauthenticated cooling apparatus 300 may have on the operation of the digital camera 100 is not clear, a configuration may be adopted such that the user can specify a policy regarding operation control to be applied not only during the execution of high-load processing but also during the execution of arbitrarily defined processing. For example, the computation load in the digital camera 100 may become higher than in normal times during the execution, by the digital camera 100, of processing such as image-data recording processing and image capturing processing at an ISO sensitivity higher than or equal to a predetermined value. Accordingly, the present invention may be implemented in a form such that, for an unauthenticated target cooling apparatus, user input is accepted of a policy regarding operation control under a situation in which arbitrarily defined processing that is determined in advance is executed.

Modification 4

In the above-described embodiments, description has been provided of a form of implementation in which the connection control unit 109 controls the operation of the cooling apparatus 300 if the digital camera 100 and the cooling apparatus 300 are connected via the image-capturing-side connection unit 110 and the cooling-side connection unit 301; however, the present invention is not limited to being implemented in such a form. That is, the connection between the digital camera 100 and the cooling apparatus 300 is not limited to wired connection, and the digital camera 100 and the cooling apparatus 300 may be connected wirelessly. In this case, information communication and power transmission that the connection detection unit 401 and the operation control unit 402 perform with the cooling apparatus 300 would be performed wirelessly.

Modification 5

In the above-described embodiments, the digital camera 100 has been mentioned as an example of an apparatus including a control apparatus that controls the operation of a cooling apparatus; however, the present invention is not limited to being implemented in such a form. For example, the present invention is also applicable to other information processing apparatuses having an image capturing function, such as a smartphone or a PC. Furthermore, the apparatus including the control apparatus does not necessarily need to have the image capturing function, and it is needless to say that the present invention is applicable to any apparatus that includes a heat source and that is configured to be capable of operating with a cooling apparatus connected thereto.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-205986, filed Dec. 22, 2022, which is hereby incorporated by reference herein in its entirety.

What is claimed is:

1. A control apparatus comprising:
at least one processor and/or circuit; and
at least one memory storing computer program, which causes the at least one processor and/or circuit to function as following units:
a detecting unit configured to detect connection of a cooling apparatus;
an authenticating unit configured to authenticate the cooling apparatus whose connection has been detected by the detecting unit; and
a controlling unit configured to control operation of the cooling apparatus,
wherein, in a case where the cooling apparatus is not authenticated by the authenticating unit, the controlling unit accepts input of a policy regarding control of the operation of the cooling apparatus and controls the operation of the cooling apparatus based on the input policy, and
the authenticating unit does not authenticate the cooling apparatus in a case where the cooling apparatus whose connection has been detected is not a cooling apparatus that has been registered in advance or in a case where the cooling apparatus whose connection has been detected does not conform to a predetermined standard.

2. The control apparatus according to claim 1,
wherein the control apparatus is an apparatus that is incorporated in an information processing apparatus including a heat source, and
the policy defines details of the control of the operation of the cooling apparatus in accordance with operation states of the information processing apparatus.

3. The control apparatus according to claim 2,
wherein the operation states of the information processing apparatus for which operations are defined in the policy include a state in which predetermined processing is executed in the information processing apparatus.

4. The control apparatus according to claim 3,
wherein the input of the policy includes specifying whether or not the operation of the cooling apparatus is to be changed under a situation in which the predetermined processing is executed.

5. The control apparatus according to claim 3,
wherein the controlling unit controls the operation of the cooling apparatus by controlling an amount of power supplied to the cooling apparatus.

6. The control apparatus according to claim 5,
wherein the control apparatus shares a same power source as the information processing apparatus, and
the predetermined processing is processing in which power consumption exceeds a threshold in a case where the processing is executed in the information processing apparatus.

7. The control apparatus according to claim 5,
wherein the policy defines that the amount of power supplied to the cooling apparatus is to be reduced under a situation in which the information processing apparatus is executing the predetermined processing.

8. The control apparatus according to claim 3,
wherein the controlling unit controls the operation of the cooling apparatus by transmitting a control command that relates to drive of the cooling apparatus.

9. The control apparatus according to claim 8,
wherein the control apparatus shares the same computational resources as the information processing apparatus, and
the predetermined processing is processing in which computation amount exceeds a threshold in a case where the processing is executed in the information processing apparatus.

10. The control apparatus according to claim 8,
wherein the policy defines that the control command transmitted to the cooling apparatus is to be changed under a situation in which the information processing apparatus is executing the predetermined processing.

11. The control apparatus according to claim 1,
wherein, in a case where the cooling apparatus is authenticated by the authenticating unit, the controlling unit controls the operation of the cooling apparatus based on an operation control policy set in advance with respect to the cooling apparatus.

12. The control apparatus according to claim 1,
wherein the computer program further causes the at least one processor and/or circuit to function as
a notifying unit configured to provide, in a case where the cooling apparatus is not authenticated by the authenticating unit, a notification that normal operation of the cooling apparatus is not guaranteed.

13. The control apparatus according to claim 1,
wherein the authenticating unit does not authenticate the cooling apparatus in a case where communication cannot be performed with the cooling apparatus whose connection has been detected.

14. An image capturing apparatus configured so that a cooling apparatus is connectable thereto, the image capturing apparatus comprising:
an image capturing unit;
an operation inputting unit configured to accept input operations; and
the control apparatus according to claim 1.

15. A non-transitory computer-readable storage medium storing a program for causing a computer to function as the units of the control apparatus according to claim 1.

16. A control method for a control apparatus, the control method comprising:
detecting connection of a cooling apparatus;
authenticating the cooling apparatus whose connection has been detected in the detecting; and
controlling operation of the cooling apparatus,
wherein, in a case where the cooling apparatus is not authenticated, input of a policy regarding control of the operation of the cooling apparatus is accepted and the operation of the cooling apparatus is controlled based on the input policy, and the cooling apparatus is not authenticated in a case where the cooling apparatus whose connection has been detected is not a cooling apparatus that has been registered in advance or in a case where the cooling apparatus whose connection has been detected does not conform to a predetermined standard.

* * * * *